3,810,850
PIPERAZINE PHOSPHATES AS FIRE RETARDANTS
FOR ORGANIC POLYMERS
Richard Lee Rowton, Austin, Tex., assignor to Jefferson
Chemical Company, Inc., Houston, Tex.
No Drawing. Filed Jan. 8, 1973, Ser. No. 321,794
Int. Cl. C08g 51/60
U.S. Cl. 260—2.5 AJ
26 Claims

ABSTRACT OF THE DISCLOSURE

Piperazine phosphates of the formula

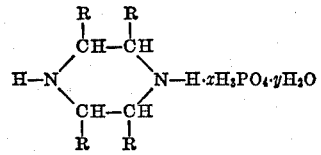

wherein $x$ is 1 or 2, $y$ is 0 or 1 and each R, taken individually, is hydrogen or lower alkyl, and piperazine pyrophosphate act as fire retardants for organic polymers.

BACKGROUND OF THE INVENTION

This invention relates to new fire retardants for organic polymers especially when used in the form of castings, coatings, or foams. In many cases the fire retardant of my invention also provides an intumescent barrier when the organic polymer is exposed to an ignition source giving additional fire protection. A coating or material is said to intumesce when it enlarges or expands and chars with exposure to heat and flame. Upon exposure to fire, the surface swells and chars forming an insulating fire retardant barrier between the flame and unexposed portions of the plastic material and any substrate upon which it may be cast.

With the rapidly expanding use of organic polymers in furniture, decorative materials, automobiles and as construction materials, the need to adequately protect against the ravages of an uncontrollable fire becomes ever greater. Recognizing this dire need, legislation and regulations have been promulgated which set burn and flammability standards for organic polymers. Unfortunately, many of the organic polymers in wide use to benefit man also provide a great danger to the very existence of those whom it serves in view of the high flammability and susceptibility to fire of many of these materials.

The effort by those skilled in the art has been continuing for many years to develop adequate fire retardants, whether they be non-reactive, additive materials or fire retardant materials which can be incorporated into the resin itself as a reactant. One class of materials commonly used has been various esters of phosphoric acid and other phosphorus-containing compounds. A number of these are in the form of inert materials added to the resin prior to the polymer-forming reaction. Many of these materials are unsatisfactory since they often either detrimentally affect the properties of the organic polymer or are leached from the polymer by exposure to weather due to water solubility.

A number of other esters of phosphoric acid known to be used as fire retardants which are the reaction products of epoxides, alcohols, glycols or higher functionality hydroxyl-containing compounds which are reacted with phosphoric acid and take part in the plastic-forming reaction, particularly in the case of the formation of polyurethane materials. Halogenated phosphate esters, such as tris(2,3-dibromopropyl) phosphate, have been found to be good fire retardants in some organic polymer systems.

In addition to the studies being made concerning fire retardants alone, extensive research has been carried out to discover fire retardants which would impart an intumescent quality to the material itself. Most of this work has been directed to the formaion of fire retarded intumescent paints resulting from the advent of the plastic polymer paints commonly called, for example, "latex" paints. A recent article by H. L. Vandersall, "Intumescent Coating Systems, Their Development and Chemistry," The Journal of Fire and Flammability, 2, 87 (1971), contains a very comprehensive discussion of the state of the art in the preparation of intumescent coating systems. Many systems are described, such as metal phosphates, various aminoplast resins, diammonium phosphate and guanylurea phosphate but the choice now being based upon either melamine phosphate or ammonium polyphosphate. However, it is known that even these materials have many shortcomings and that in some systems are ineffective.

However, even when the combination of the criteria believed to be necessary are followed, an intumescent protective coating is not necessarily formed. Further, there is a significant lack of predictability in determining what agents or combination of agents will work and what agents will fail. Practitioners in the art agree that generally two or more components are required to obtain a non-burning, intumescent system. For example, U.S. Pat. 3,681,273 described a two-component system for imparting non-burning and intumescent properties to flexible polyurethane foams where (a) a nitrogen and phosphorous-containing compound and (b) a nitrogen-containing polyol must be used together. While directed only to a single system, there are inherent shortcomings in the described approach since the polyurethane system itself is effected by the fact that one of the necessary ingredients to impart the non-burning intumescent quality to the flexible foam, the nitrogen-containing polyol, is a significant reactant in the urethane-forming reaction.

Where the fire retardant or intumescent agent is to be used in a coating or casting which is exposed to the weather, the water solubility becomes important. Water solubility of the material added limits the applicability of some candidates for a system and has caused additional problems for the researcher of ordinary skill in the art in finding a satisfactory system.

Accordingly, it is the object of my invention to provide an inexpensive, single component additive which, when incorporated into an organic polymer, especially those in the form of a coating, casting or foam, will impart fire retardant and, in many cases, intumescent properties to the organic polymer. Such a material is the subject matter of my invention.

SUMMARY OF THE INVENTION

In accordance with the practice of my invention, organic polymers, usually in the form of coatings, castings or foams, are made fire retardant, and in many instances, intumescent by the incorporation of an effective amount of a piperazine phosphate salt of the formula

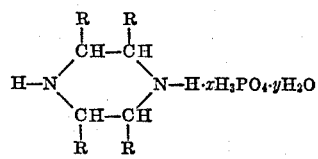

wherein $x$ is 1 or 2, $y$ is 0 or 1 and each R, taken individually, is hydrogen or lower alkyl having one to about four carbon atoms or a piperazine prophosphate salt which may be prepared by the reaction of piperazine and sodium pyrophosphate decahydrate, for example. The effective amount useful can be readily determined by routine experimentation from the following discussion and examples. For the purposes of simplification of the discussion of my invention both the piperazine salts defined by the foregoing structure and the piperazine pyrophosphates will be referred to hereinafter as the piperazine phosphate salts of my invention.

DESCRIPTION OF THE PREFERRED EMBODIMENTS

Surprisingly, it has been discovered that the piperazine phosphate salts of my invention impart surprising fire retardant and intumescent qualities to organic polymers. These materials have been found most effective in organic polymeric coatings, castings or foams. The preferred compound of the class is piperazine monophosphate monohydrate since it is fairly inexpensive and readily available since it is produced in commercial quantities for use as an anthelmintic compound for animals. It has the further special property of being substantially water insoluble. However, the substituted piperazine phosphate salts and the higher hydrates thereof as well as piperazine pyrophosphate are also applicable to the practice of my invention. These salts, being solids, can also act as fillers to extend the resins used to prepare the organic polymers while still imparting to the polymer the desired fire retardant properties.

While piperazine phosphate monohydrate is readily available commercially, the following preparations are given for other preferred species useful in the practice of my invention; piperazine diphosphate, 2-methylpiperazine monophosphate monohydrate and piperazine pyrophosphate.

PREPARATION A.—PIPERAZINE DIPHOSPHATE

Piperazine diphosphate was prepared by adding a solution of 86 g. (1 mol) of anhydrous piperazine in 200 g. of water to a solution of 231 g. (2 mols) of 85 percent phosphoric acid. The resulting solution was added to 1500 ml. of acetone with rapid stirring. The resulting precipitate was filtered off, washed with acetone, and dried at 60–70 C. overnight. Two hours at 60° C. under full vacuum resulted in no further loss of weight. The yield was quantitative. Piperazine diphosphate is water-soluble.

The diphosphate was ball-milled with 1 percent by weight of fumed silica anticaking agent.

PREPARATION B.—2-METHYLPIPERAZINE MONOPHOSPHATE MONOHYDRATE 2-methylpiperazine monophosphate monohydrate was prepared by adding a solution of 115 g. (1 mol) of 85 percent phosphoric acid in 200 g. of water to a solution of 100 g. (1 mol) of 2-methylpiperazine in 300 g. of water. The resulting salt was water-soluble, as opposed to the unsubstituted analog, and therefore did not precipitate. It was precipitated by adding the aqueous solution to 2000 ml. of acetone. The precipitate was filtered and washed with a little acetone, and then dried overnight in an oven at 60° C. Further drying under full vacuum at room temperature for 24 hours did not cause any further loss of weight. A 95 percent yield of the monophosphate monohydrate was obtained.

PREPARATION C.—PIPERAZINE PYROPHOSPHATE

To a solution of 43 g. (1 eq.) of anhydrous piperazine and 111 g. (1 eq.) of sodium pyrophosphate decahydrate, $Na_4P_2O_7 \cdot 10H_2O$, in 1500 g. of water was added, with stirring, a solution of 36 g. (1 eq.) of hydrochloric acid in 200 g. of water. The piperazine pyrophosphate slowly precipitated after addition of acid was complete.

The suspension of pyrophosphate was stirred overnight and then allowed to settle. The supernatant liquid was decanted and the precipitate was washed with 200 g. of water by stirring. The suspension was again allowed to settle and the supernatant liquid drawn off. A solution of 40 eq. of methanol and 200 g. of water was added with stirring, and the suspension filtered. The filter cake was washed; first with a 2:1 methanol:water solution and finally with pure methanol. The fluffy, shiny plates were dried at 100° C. to constant weight. Yield: 66 g. (75% of theory). The product substantially insoluble in water.

Contrary to the conventional practice in forming intumescent coatings where several ingredients in addition to the polymeric resin are required to supply a carbon source, an acid reacting catalyst, a blowing agent and nitrogenous compounds, I have discovered surprisingly that this class of piperazine salts, particularly piperazine monophosphate monohydrate, piperazine diphosphate, piperazine pyrophosphate and 2-methylpiperazine monophosphate monohydrate can be used as a single replacement for all of the above previously-used components.

These salts are crystalline substances which do not burn when subjected to a flame. Instead, they act as a heat sink and intumesce to form the desired carbonaceous foam.

In addition, the color of piperazine phosphate salts is white-to-colorless. This allows them to be mixed with conventional pigments such as titanium dioxide, silicone dioxide, zinc oxide, for example, to pigment the system. My invention does not preclude the use of the piperazine salt with other fire retardant agents or intumescing materials in any particular organic polymer resin. However, as will be seen from the description hereafter, these piperazine phosphate salts have wide applicability as fire retardants and/or intumescing agents when used as the sole fire retardant.

The piperazine phosphate salts are particularly useful in coatings, castings and foams produced by organic polymers. Particularly, they are applicable to moisture-cured polyurethane coatings, polyvinyl acetate emulsion coatings and adhesives, epoxy coatings and castings, polyester resins and polyurethane foam, both flexible and rigid. Additionally, they are useful in fire retarding polyamide and polyurea resins. Those skilled in the art are quite familiar with these particular organic polymers, their composition and the fire retardants available to use in the system. It is significant, however, that none of those skilled in the art working with these polymers have discovered that the piperazine phosphate salts described herein are outstanding fire retardants and intumescing agents for organic polymers. Therefore, in view of the description herein, it will be apparent to those skilled in the art that the piperazine phosphate salts of my invention are applicable to wide ranges of organic polymers, particularly those used in the form of coatings, extrusions, castings and/or foams.

The following discussion of specific polymer systems with exemplification should not be construed as limiting the practice of my invention to those specific systems, but should be considered as instruction which will aid those in the art to easily determine the effective amount of the piperazine salt to use and through modifications obvious to those of ordinary skill in the art, will make the use of my fire retardant applicable to other systems not specifically discussed or mentioned herein.

POLYVINYL ACETATE POLYMERS

Polyvinyl acetate has wide usage in the form of an emulsion as an adhesive and coating material. Polyvinyl acetates, both in the emulsion form or otherwise, are derived from the polymerization of a vinyl acetate monomer.

The vinyl acetate monomer has been commercially produced since the 1930's and the five well-known routes to the vinyl acetate monomer are the acetylene process, the one-stage and two-stage liquid phase processes and the two gaseous phase processes. The acetylene route employs acetylene and acetic acid as the raw materials. The other processes are based upon a reaction between acetic acid, ethylene and oxygen in the presence of various catalysts. Since these processes are so well known, additional discussion herein is unnecessary for teaching one skilled in the art the practice of my invention.

The vinyl acetate monomer regardless of how it is produced, is polymerized to polyvinyl acetate through various processes known as emulsion polymerization, suspension polymerization, or solution polymerization. The important ethylene-vinyl acetate copolymers are also produced by an emulsion polymerization route. Vinyl acetate polymers produced by any of the aforementioned well-known and widely-practiced polymerization routes would be applicable to the practice of my invention by incorporating therein the piperazine phosphate salt as a filler in some stage of the polymerization process, usually after the monomer has been polymerized during the work-up procedures. The piperazine phosphate can be added to finished emulsion polymers at any time prior to their application to a substrate.

The products from each process result in an emulsion suitable for paints or adhesives, beads for formulation into adhesives or other products and pellets for the formation into similar products. The ethylene-vinyl acetate copolymer process can be used to produce an emulsion formulation. Polyvinyl acetate emulsions were first made in Germany in the 1920's and became available in the United States in the late 1930's and therefore are widely used in emulsion paints and adhesives, the most important commercial uses of polyvinyl acetates.

With respect to the practice of my invention, it is unnecessary to describe the processes by which the vinyl acetate polymers are made. However, for those interested in reviewing the processes, some references follow: suspension polymerization—U.S. Pat. 2,965,623; solution polymerization—U.S. Pats. 2,610,360; 2,878,168; and 3,259,555; and emulsion polymerization—U.S. Pats. 3,036,054; 3,318,948; 2,614,087; and 2,998,400. Of particular interest is U.S. Pat. 2,956,973, which describes a process for making vinyl acetate polymer latex for paint. The foregoing list is by no means exhaustive and is offered by way of example only. Emulsion polymerization is the most widely practiced process.

The practice of my invention, i.e., incorporating the piperazine phosphate salt fire retarder, can be successfully practiced with the emulsion polymerization process by adding an effective amount of a piperazine phosphate salt to the emulsion polymer. While any of the piperazine phosphate salts previously described are applicable to the practice of my invention, the preferred material is the piperazine monophosphate monohydrate material where water insolubility is desired. Where water insolubility is not a factor, piperazine diphosphate (no water of hydration) or 2-methylpiperazine monophosphate monohydrate are preferred in addition to the previously mentioned species. However, in the case of the polyvinyl acetate emulsion, the water insoluble piperazine monophosphate monohydrate has particular significance since the water soluble material thickens the emulsion somewhat.

I have found that a 50—50 mixture by weight imparts particularly good fire retardant and intumescent properties to a coating made of a polyvinyl acetate emulsion polymer. As low as about 25 percent by weight addition imparts fire retardancy to the polymer. The following examples are illustrative of the practice of my invention for those skilled in the art to the obvious modifications thereof.

EXAMPLE 1

Crystalline piperazine monophosphate monohydrate was mixed in a 1·1 weight ratio with a commercial vinyl acetate emulsion (Elmer's Glue—Borden Company). A piece of self-extinguishing rigid urethane foam was used as a substrate and coated with the resulting mixture to a 5–10 mil dry thickness. A similar coating was made from the vinyl acetate emulsion alone. After drying, the flame of a blow torch was directed at each coating. The unmodified coating burned freely and was not self-extinguishing, while the vinyl acetate coating containing the piperazine phosphate intumesced and formed a fire-resisting carbonaceous layer.

EXAMPLE 2

Powdered piperazine diphosphate prepared according to preparation A, supra, was stirred into a vinyl acetate emulsion (Elmer's Glue—Borden Company) at a weight ratio of 2:1:1 emulsion:diphosphate:water. The resulting mixture was spread onto a piece of cut rigid urethane foam and allowed to dry. In the heat of a blow torch flame, the coating intumesced and was self-extinguishing when the flame was removed.

EXAMPLE 3

A thin slurry was made by stirring together piperazine pyrophosphate prepared according to preparation C, a vinyl acetate emulsion (Elmer's Glue), and water in a 5:10:1 weight ratio. The slurry was spread on a piece of cut rigid polyurethane foam and allowed to dry. On exposure to a blow torch flame, the coating burned without intumescing, but was self-extinguishing when the flame was removed.

MOISTURE-CURED POLYURETHANE COATINGS

These coatings are formed by the reaction of a polyhydric compound, either polyether or polyester, with an organic polyisocyanate, usually in the presence of a solvent and applied to a substrate. A large excess of unreacted isocyanate groups are present which react with the moisture in the air to cure the resin to a hard durable finish protecting the substrate from attack by the weather. In the practice of my invention when the piperazine phosphate salt is added to said moisture cured coating the substrate is also protected from damage by fire.

Those organic polyisocyanates useful in the practice of my invention are those organic diisocyanates, triisocyanates and polyisocyanates which are well known to practitioners in the urethane art. Examples of such useful organic polyisocyanates are the mixed isomers of toluene diisocyanate which are readily available commercially, the polyisocyanates prepared by the phosgenation of the reaction product between aniline and formaldehyde to give methylene bridged phenyl isocyanates such as diphenylmethane diisocyanate in its isomeric forms and the higher functionality polymethylene polyphenyl isocyanates, which materials are commonly called polyaryl polyisocyanates. The polymethylene polyphenyl polyisocyanates which are especially useful in the practice of my invention have a functionality of from above 2.0 to about 3.3. An especially preferred functionality range is from about 2.0 to about 2.9.

Toluene diisocyanates can also be mixed with the polyarylisocyanates and used as a unit in the production of these coatings. This particular isocyanate mixture is described in U.S. Pat. 3,341,463. Further discussions of organic polyisocyanates are found in U.S. Pats. 3,298,976; 2,683,730; 3,344,162 and 3,362,979, for example.

Polyether polyols useful in the production of moisture cured polyurethane coatings are those polyhydric compounds prepared by the reaction of a polyhydric initiator such as ethylene glycol, propylene glycol, other glycols, trimethylol propane, sorbitol, sucrose, methylglucoside and the like with alkylene oxides in a base-catalyzed reaction. This process is well known to those skilled in the art. The alkylene oxides used may be preferably those alkylene oxides having from 2 to 4 carbon atoms, and mixtures thereof, yet higher alkylene oxides may also be useful. More than one alkylene oxide may be added to the polyhydric initiator, either in a heteric mixture or sequentially to form a block polyoxalkylene polymer.

The molecular weight of polyols useful in the production of moisture-cured coatings may vary widely depending upon the amount of flexibility desired in the coating. Generally, however, a maximum of 7,000 molecular weight is a practical limit even though a higher molecular weight may be useful in some coatings. In any case, the formulation of moisture-cured coatings themselves are well within the skill of the ordinary practitioner of the urethane art. A particularly preferred polyether polyol is that which is the reaction product of a trihydric alcohol such as glycerin or trimethylolpropane with ethylene oxide and propylene oxide which has been capped or "tipped" with ethylene oxide to increase the primary hydroxyl content of the molecule. High molecular weight block polyether polyols are described in U.S. Pat. 3,535,-307 and the "tipped" polyether polyols are described in U.S. Pat 3,336,242.

It should be understood by those skilled in the art that the production of moisture cured urethane compositions using the fire retardants of my invention may result from the reaction of either polyester or polyether polyols with organic polyisocyanates. Suitable polyester polyols are described in U.S. Pat. 3,391,093, for example.

Moisture cured coatings generally need a catalyst of urethane reaction to speed the preparation of the polymer, i.e., the reaction between the hydroxyl group and the isocyanate group. Suitable catalysts are organo-tin compounds such as dibutyltin dilaurate or dioctyltin diacetate, for example. This class of catalyst is described in U.S. Pat. 3,194,773, for example. The reaction of the free isocyanate groups with moisture in the atmosphere generally occurs without the aid of a catalyst.

In the preparation of moisture cured coatings, it is often desirable to incorporate the polyurethane composition, i.e., the reaction product of the isocyanate and the polyol, in an inert solvent such as toluene or xylene. These materials are well known to those skilled in the art. It is further well known that the isocyanate and polyol reactants are present in proportions such that a high amount of free isocyanate groups are left unreacted after the reaction with the polyol to react with the moisture in the atmosphere thus curing the coating. The ratio of isocyanate groups to hydroxyl groups (isocyanate index) optimumly varies from 1.5 and up to a maximum of about 20.0 with a preferred range of about 8 to about 16.

The piperazine phosphate salt of my invention is incorporated into the moisture cured coating composition as a filler or is blended with a pigment such as titanium dioxide to provide a pigmented, filled moisture-cured coating. Routine experimentation by one skilled in the art could determine an effective amount to provide a desired degree of fire retardancy. However, I have found that about 50 percent of the piperazine phosphate salt by weight in the moisture-cured coating composition produces outstanding results when subjected to a flame. The piperazine phosphate salt is effective when present in amounts of from 10 weight percent to about 80 weight percent of coating composition depending on the desired properties of the coating. The following example is illustrative of the practice of my invention in moisture-cured polyurethane coatings.

EXAMPLE 4

A pigment mixture was made by grinding together in a mortar and pestle a mixture of piperazine monophosphate monohydrate and titanium dioxide pigment in a 3:1 weight ratio. The resulting pigment blend was mixed with a moisture curing polyurethane coating composition in toluene carrier (50-percent solution). The polyurethane composition was prepared in the following proportions:

| | Parts by weight |
|---|---|
| Ethylene oxide capped (75% primary hydroxyl) propylene/ethylene oxide capped adduct of trimethylolpropane having a molecular weight of about 6,500 | 60 |
| Polymethylene polyphenyl isocyanate having a functionality of 2.2 | 55 |
| Dibutyltin dilaurate | 0.5 |

Isocyanate index=15.3.

A blend of 20 grams of the above pigment mixture and 17.2 grams of the moisture-cured coating material along with 2.8 grams toluene, was made by rolling the ingredients together.

Various substrates were coated with the resulting paint (steel plate, wood and urethane foam) and the coating allowed to dry and cure by exposure to the moisture in the atmosphere. The resulting coating, while rough because of poor pigment dispersion, was firm and somewhat flexible, and had good integrity.

Upon application of heat via a blow torch impinging on the material, the coating did not flame. Instead it intumesced to about 10 times its original thickness and protected the substrates from the flames.

POLYURETHANE FOAM COMPOSITIONS

Basically, a polyurethane foam is the organic polymer resulting from the reaction of an organic polyol with an organic polyisocyanate in the presence of a catalyst and a blowing agent. Much of the discussion concerning the ingredients for polyurethane foams is the same as the preceding discussion concerning the ingredients for the moisture-cured polyurethane coating composition. However, other ingredients are used for polyurethane foams and the isocyanate index, i.e., the ratio of —NCO groups to —OH groups, is more nearly stoichiometrically equivalent having an isocyanate index from about 0.9 to about 1.2 generally. The polyisocyanates useful in the practice of this species of my invention are those same organic isocyanates described above in the section on moisture-cured polyurethane coatings and the preferred materials are those polymethylene polyphenyl polyisocyanates having a functionality of from 2.0 to about 3.3 and especially from about 2.2 to about 2.9.

Those of ordinary skill in the art are well versed in the production of both flexible and rigid polyurethane foams and the distinction between the components used to produce rigid and flexible foams. However, some discussion is apropos.

Polyether polyols useful for the practice of this invention are generally those having functionalities from 2 to 8 and a molecular weight of about 2,000 to about 13,000. Certain preferred polyether polyols are described in U.S. Pat. 3,535,307 and U.S. Pat. 3,336,242 previously mentioned. Polyether polyols are well known and may be prepared by any known processes such as the process discussed in the Encyclopedia of Chemical Technology, vol. 7, pp. 257–262, published by Interscience Publishers, Inc. in 1951.

Polyester polyols are generally produced by reacting a dibasic acid such as adipic acid with a glycol or a polymeric glycol, the preferred being ethylene glycol or polyethylene glycols having molecular weights of from generally 200 to about 2,000. Polyester polyols are described in U.S. Pat. 3,391,093, for example, and are well known to those of ordinary skill in the art.

The foam resulting from the reaction of the foregoing polyols with an organic polyisocyanate will be either flexible or rigid depending on the degree of crosslinking produced in the polymer. Generally, the higher molecular weight polyether polyols having longer oxyalkylene chains are used to form flexible polyurethanes whereas those of shorter chain lengths go into the production of rigid polyurethane foams. As a rule followed by those skilled in the art, polyether polyols having a hydroxyl number from almost 20 to about 60 are generally considered suitable for the production of flexible polyurethane foams whereas polyether polyols having hydroxyl numbers from about 300 to about 650 are generally considered to be rigid polyether polyols. Those of intermediate hydroxyl numbers are often blended with other polyols or used to make semiflexible or semi-rigid foams. Again, the choice is well within the skill of those in the art.

In the production of polyurethane foams, it is also well known that certain other additives are often desirable to attain certain foam properties. Silicone surfactants act as a foam stabilizer to control the amount and quality of the foam polyurethane obtained. These materials may or may not be necessary in the formulation. Various silicone compounds and silicone oil mixtures are used for this purpose such as dimethylsiloxane-oxyalkylene glycol copolymers sold under various trade names. A discussion of many satisfactory silicone foam stabilizers can be found in U.S. Pat. 3,194,773. The silicone surfactant foam stabilizing agent, if used, is present in an amount of about 0.1 to 3 parts by weight per 100 parts of the polyol used in the urethane reaction.

In order to produce polyurethane foam, it is necessary to include a blowing agent in the formulation which is generally water in the instance of a flexible foam where an open cell structure is desired. Water may be either used alone or together with halogenated alkanes such as methylene chloride, and the chlorofluoromethanes and chlorofluoroethanes. These latter materials are often used alone as blowing agents. Blowing agent selection is well within the skill of the ordinary practitioner and additional discussion of the selection and amounts used is also found in U.S. Pat. 3,194,773. The amount of blowing agent varies from about 0.1 part by weight to about 4.5 parts by weight (based upon 100 parts by weight of the polyol) in the case of water and from 1 to about 15 parts by weight in the case of inert blowing agents.

In the production of the urethane foams, it is also necessary to include a catalyst in the urethane formulation, such catalyst being either an organometallic catalyst such as stannous octoate, stannous oleate, stannous laurate, dibutyltin di-2-ethylhexoate, dibutyltin dibutoxide, dibutyltin dilaurate, phenylmercuric propionate and phenylmercuric acetate for example. The corresponding lead, zinc and iron compounds have also found utility for this use. Tertiary amine catalysts are also useful in the production of urethane foams either alone or in admixture with the organometallic catalyst. Examples of such catalysts are triethylenediamine, 2 - methyltriethylenediamine, N-methylmorpholine, N-ethylmorpholine, triethylamine, tetramethylpropanediamine, dimethylethanolamine, trimethylaminoethylpiperazine, dimorpholinodiethylether and the like.

As has been mentioned hereinbefore, many fire retardants have been tried, for example, tris(2-chloroethyl) phosphate, tris(2,3-dibromopropyl) phosphate, diammonium phosphate, other halogenated compounds, antimony oxide and the like. Other types of phosphorus-containing fire retardants which are reactive in the urethane forming reaction itself are also known. However, present fire retardants are still wanting in many respects.

The piperazine phosphate salts of my invention not only function as outstanding fire retardants for polyurethane foams, but are also such that they act as fillers or pigments extending the polyurethane reactant system. They may be incorporated into the system in effective amounts either alone or in a mixture with pigments and other known fillers. My preferred range is from 1 to about 20 weight percent of the piperazine phosphate salt in rigid foams and from 1 to about 12 weight percent of piperazine phosphate salts in flexible foams, outstanding fire retardancy can be attained. While 1 weight percent appears to be a minimum effective amount for some foam systems, the upper limits are only practical limits and adding additional amounts of the piperazine phosphate salt above said limits may prove wasteful.

Also, it should be noted here that the foregoing discussion and following examples for polyurethane foams would be applicable for solid polyurethane polymers and also polyamide polymers such as a filled nylon casting or polyurea materials such as polymer coatings with only minor modifications by those of ordinary skill in the art.

The following examples illustrate the practice of my invention with respect to rigid and flexible polyurethane foams and should not be considered as limiting of the scope of my invention but merely as instruction to those skilled in the art in the practice of my valuable invention.

EXAMPLE 5

Crystalline piperazine monophosphate monohydrate was incorporated into a rigid polyurethane foam composition:

| | P.b.w. |
|---|---|
| Polyol (69:31 by weight) blend of a 9-mole propylene oxide adduct of sucrose and a 4-mole propylene oxide adduct of triethanolamine | 32.6 |
| Silicone surfactant (DC-193 [1]) | 0.5 |
| N,N,N',N'-tetramethyl-1,2-propanediamine | 0.3 |
| Trichlorofluoromethane | 14.0 |
| Polymethylene-polyphenylisocyanate of functionality 2.7 (PAPI [2]) | 43.3 |
| Piperazine monophosphate monohydrate | 9.3 |

[1] Dow-Corning.
[2] Upjohn.

The polyol, silicone, catalyst and piperazine phosphate were mixed in a one quart paper cup with a drill press-type stirrer. The trichlorofluoromethane was added and mixed in. The isocyanate was added, and the material was mixed for 15 seconds, then poured into an 8" x 10" box and allowed to rise and cure.

On exposure to a blow torch flame, the foam charred and had a firm crust. The foam was self-extinguishing when the flame was removed. A foam prepared without the piperazine phosphate burned readily and was not self-extinguishing.

EXAMPLE 6

Crystalline piperazine monophosphate monohydrate was incorporated into a rigid polyurethane foam formulation:

| | P.b.w. |
|---|---|
| Polyol (the product obtained by the addition of 3 moles of propylene oxide to the Mannich condensation product of p-t-butylphenol, formaldehyde, and diethanolamine in a molar ratio of 1:2:2, OH No. 541) | 35.3 |
| Silicone surfactant (DC-193 [1]) | 0.5 |
| Polymethylenepolyphenyl polyisocyanate of functionality 2.7 (PAPI [2]) | 43.7 |
| Piperazine monophosphate monohydrate | 7.5 |
| Isocyanate index: 1.05. | |

[1] Dow-Corning.
[2] Upjohn.

The polyol, silicone, and phosphate were mixed with a drill press-type stirrer. The trichlorofluoromethane was added and mixed in. The isocyanate was added and the materials were mixed for 15 seconds and then poured into an 8" x 10" box and allowed to rise and cure.

A similar foam was prepared without the inclusion of piperazine phosphate.

On exposure to a blow torch flame, the foam without the piperazine phosphate burned readily and, continued to burn after the torch flame was extinguished. The foam containing piperazine phosphate went out as soon as the impinging flame was removed.

The two foams were compared by ASTM method 1692:

| | Inches burned | Burn time, seconds |
|---|---|---|
| Foam without piperazine phosphate | 2.38 | 54.2 |
| Foam with piperazine phosphate | 0.94 | 36.2 |

EXAMPLE 7

A flexible urethane foam was prepared using the following materials:

|  | P.b.w. |
|---|---|
| Thanol® E-4003 [1] (a 4000-mole wt. ethylene oxide capped polyoxypropylene diol having a primary hydroxy content 50%) | 80 |
| Thanol® SF-6501 [1] (a 6500-mole wt. ethylene oxide capped polyoxyethylene/polyoxypropylene triol having a primary hydroxyl content of about 75%) | 20 |
| Trimethylaminoethylpiperazine | 0.3 |
| N-ethylmorpholine | 0.5 |
| Triethylenediamine (Dabco LV-33 [2]) | 0.5 |
| Dibutyltin dilaurate | 0.01 |
| Silicone surfactant (DC-200 [3]) | 0.005 |
| Water | 3.0 |
| Polymethylene polyphenyl polyisocyanate of functionality 2.2 (Thanate® P-220 [1]) | 53.5 |
| Isocyanate index: 1.05 |  |

[1] Jefferson Chemical Co., Inc.
[2] Houdry Process Company.
[3] Dow-Corning.

All ingredients except the polyisocyanate were mixed with a drill press stirrer. The polyisocyanate was added, the mixture stirred for 8 seconds and poured into a box to rise. The rise time was 200 seconds and gel time, 480 seconds. After 8 minutes the foam was placed in a 140° C. oven for 5 minutes, then removed, crushed, and allowed to stand for several days.

The first foam was ignited by means of a match and continued to burn and propagate the flame after the external heat source was removed. The foam containing piperazine phosphate was self-extinguishing and the flame went out whenever an impinging flame was removed.

An attempt to prepare a similar foam in which melamine phosphate was the fire retardant failed because this salt deactivated the gelling catalysts and prevented the foam from forming. In a similar manner, 15 parts of ammonium polyphosphate (Phoschek P-30, Monsanto Company) also deactivated the catalyst. Thus the more popular fire retardant/intumescing agents were inoperable.

EXAMPLE 8

This example illustrates the use of various amounts of piperazine phosphate monohydrate as a fire retarder in a particular type of flexible urethane foam.

Basic foam formulation:

|  | P.b.w. |
|---|---|
| Polyol (an ethylene oxide capped polyoxypropylene-polyoxyethylene glycol of 4000 mole wt. containing 50% primary hydroxyl groups) | 100 |
| Triethylenediamine solution (Dabco LV-33 [1]) | 0.5 |
| Trimethylaminoethylpiperazine | 0.3 |
| N-ethylmorpholine | 0.5 |
| Dibutyltin dilaurate | 0.01 |
| Silicone surfactant (DC-200—Dow Corning) | 0.005 |
| Water | 2.7 |
| Polymethylene polyphenyl polyisocyanate of functionality 2.2 (Thanate® P-200 [2]) | 50 |
| Isocyanate index: 1.05. |  |

[1] Houdry Process Company.
[2] Jefferson Chemical Co., Inc.

Into this basic formulation, various amounts of piperazine phosphate were incorporated.

Procedure.—The formulation was doubled, gram-wise. Piperazine phosphate monohydrate was mixed with the polyol for 20 seconds with a drill press stirrer. Catalysts and silicone surfactant were mixed in for 5 seconds. Water was mixed in for 20 seconds. Finally, the polyisocyanate was added, materials mixed for 8 seconds and then poured into an 8″ x 12″ cardboard box. After gelation, the foam was cured further for 5 minutes at 140° C.

The bottoms of the samples were cut off so that buns were about 3 inches thick. Methenamine tablets (No. 1588, Eli Lilly) were placed on the cut surface of the foams and ignited. These pills burn with a hot, blue flame for 100–110 seconds.

In a similar manner foams were prepared in which the fire retardant was tris-(2,3-dibromopropyl) phosphate, a halogenated phosphate ester commonly used as a fire retardant in organic polymers, particularly polyurethanes.

RESULTS

| Weight percent of fire retardant in formulation | Piperazine phosphate monohydrate | Tris-(2,3-dibromopropyl) phosphate |
|---|---|---|
| 0 | Flaming in less than one minute, self-propagating flame. | Burned readily, self-propagating flame. |
| 1.3 | In 3 of 4 trials [1] pill burned only to 1½″ depth and was self-extinguishing.[2] Fourth trial, not self-extinguishing. | No sample at this level. |
| 2.6 | Self-extinguishing | Burned readily, self-propaga.ing flame. |
| 6.5 | do | Not self-extinguishing but burned less. |
| 12.0 | do | Self-extinguishing. |

[1] Four other trials at a 1-weight percent level of piperazine phosphate were all self-extinguishing.
[2] Self-extinguishing means the burning ceased when the pill finished urning.

From the foregoing, it is seen that piperazine phosphate monohydrate is an effective fire retarder for flexible foams at levels as a low as 1 weight percent and significantly more effective than the well-known prior art fire retardant.

EPOXY RESINS

Epoxy resin compositions are prepared by the reaction of a polyglycidyl ether of a polyhydric phenol and a diamine curing agent usually in the presence of an accelerator. The state of the art on epoxy resins and adequate instructions for those skilled in the art is found in Lee, Henry and Nevill, Kris, Handbook of Epoxy Resins, McGraw-Hill Book Co., New York, 1967 and in numerous U.S. patents including 2,582,985; 2,615,007 and 2,694,694.

Known curing agents include alkyl and aryl primary, secondary and tertiary amines, dicarboxylic acids and anhydrides thereof, Friedel-Crafts or Lewis acid-type catalyst. A preferred diamine curing agent for epoxy resins is described in U.S. Pat. 3,462,393 which teaches admixing a polyoxyalkylene polyamine with a polyglycidyl ether of the phenolic compound in order to obtain the epoxy resin. In addition to the curing agent, accelerators are often added to speed the cure. Practical systems for curing epoxy resins are described in U.S. Pats. 3,666,721; 3,549,592 and 3,639,928 for example. It should be understood, however, that it is well within the skill of the art to adapt my invention to epoxy resins whether used as coatings or casting whether used alone or as a composite or a binder for castings including an aggregate.

The piperazine phosphate salts useful in the practice of my invention are incorporated into the epoxy resin in an amount of at least 10 weight percent and up to as high as 50 weight percent as a practical limit. It should be understood though that the upper limit is not critical and merely a commercial practical consideration as well as a consideration necessary from the point of view of the properties desired from the epoxy casting or coating.

The following examples illustrate the value of my invention as it pertains to epoxy resins. It should be understood that these examples are presented by way of information and should not be considered as limiting since many modifications would be obvious therefrom.

EXAMPLE 9

An epoxy resin was prepared by mixing together 50 parts of a diglycidyl ether of bisphenol A of epoxy equivalent weight of 182–189 (Araldite 6005, Ciba) and 16 parts of a polyoxypropylenediamine of molecular weight 230. One part of a fumed silica (Cab-O-Sil M-5) was ground in for one minute on a high speed disperser to prevent pigment settling. Various amounts of piperazine monophosphate monohydrate (see below) were then incorporated in a similar manner. The mixtures were poured into ¾" x ¾" x 10" metal molds and allowed to cure overnight at room temperature. The resulting epoxy castings were then subjected to the Butler Chimney Test. In the Butler Chimney Test, a 1700° F. flame is directed over the end of a test piece for 10 seconds.

RESULTS

| Sample | A | B | C | D | E | F |
|---|---|---|---|---|---|---|
| Weight percent of piperazine phosphate | 50 | 40 | 25 | 10 | 5 | 0 |
| Seconds to extinguish after flame removed | 0 | 0 | 0 | 1 | 510 | 360 |
| Flame height (inches) | 1 | 1 | 1.5 | 2 | 11 | 11 |
| Weight percent retained | 100 | 100 | 100 | 99.94 | 29 | 0 |

Since samples A to D were essentially unaffected, these samples were subjected to the flame for an additional 60 seconds (hereinafter called modified Butler Test).

RESULTS

| Sample | A | B | C | D |
|---|---|---|---|---|
| Percent piperazine phosphate | 50 | 40 | 25 | 10 |
| Seconds to extinguish after flame removed | 0 | 0 | 1 | 575 |
| Flame height (inches) | 2½ | 2½ | 3½ | 11 |
| Weight percent retained | 99.7 | 99.7 | 99.6 | 40 |

The bottoms of the first three samples exhibited intumescent charring, but very little weight was lost. The flame on sample D went out in the chimney because of the heavy intumescent char covering the sample. A rod ½" long of unburned material remained inside the char.

Thus, a piperazine phosphate level of about 10 weight percent will fire retard this epoxy resin forming a protective intumescent coating. Higher levels make the epoxy resin casting virtually insensitive to a 1700° F. flame.

EXAMPLE 10

Powdered piperazine diphosphate (preparation A) was incorporated into an epoxy casting resin as described for the monophosphate in Example 9, except that no fumed silica was added. The diphosphate was used at the 10 and 25 percent levels.

Samples were subjected to the standard Butler Chimney Test (10 second flame exposure) as well as the modified Butler Test (60 second additional flame exposure).

RESULTS

| Type of test | Standard Butler | | Modified Butler | |
|---|---|---|---|---|
| Wt. percent piperazine diphosphate | 25 | 10 | 25 | 10 |
| Sec. to extinguish after flame removed | 0 | 0 | 0 | 0 |
| Flame height (inches) | 0.5 | 1.0 | 2 | 4.5 |
| Wt. percent retained | 100 | 100 | 99.8 | 99.7 |

EXAMPLE 11

The 2-methylpiperazine monophosphate monohydrate salt described in preparation B was ball-milled with 1% fumed silica. The resulting powder was incorporated in an epoxy casting resin as described for piperazine diphosphate in Example 9, again using the 10 and 25 percent levels. Samples were subjected to the standard and modified Butler Chimney Tests.

RESULTS

| Type of test | Standard Butler | | Modified Butler | |
|---|---|---|---|---|
| Wt. percent 2-methylpiperazine monophosphate salt | 25 | 10 | 25 | 10 |
| Sec. to extinguish after flame removed | 0 | 2 | 0 | 137 |
| Flame height (inches) | 1.0 | 3.0 | 7 | 11 |
| Wt. percent retained | 100 | 100 | 99.5 | 78.0 |

EXAMPLE 12

Epoxy castings were prepared as in Example 9 except that no anti-caking or thickening agents were used. Piperazine pyrophosphate was the fire retarder. The ¾" x ¾" x 10" castings were subjected to both the standard and modified Butler Chimney Tests.

RESULTS

| Type of test | Standard Butler | | Modified Butler | |
|---|---|---|---|---|
| Percent piperazine pyrophosphate | 25 | 10 | 25 | 10 |
| Sec. to extinguish after flame removal | 0 | 0 | 1 | 2 |
| Flame height (inches) | 2 | 2 | 5 | 5 |
| Wt. percent retained | 100 | 100 | 99.6 | 99.6 |

POLYESTER RESINS

Polyesters are produced by the esterification of acids and anhydrides with difunctional or polyfunctional alcohols. Commercial products are commonly of three main classes, i.e., saturated polyesters, unsaturated polyesters and alkyd-polyester resins. While all three classes are basically the reaction products of a polyfunctional alcohol and a dicarboxylic acid or anhydride, the alkyd-polyester resins are modified with oil or fatty acid and are used extensively in coatings. Saturated polyesters are usually produced from dihydric alcohols such as ethylene glycol and propylene glycol and saturated dicarboxylic acids. An exhaustive discussion of the alkyd-polyester resins can be found in Kirk-Othmer, eds., "Encyclopedia of Chemical Technology," 2nd ed., vol. 1, pp. 851–882, Interscience Publishers, New York, 1963.

An unsaturated polyester is produced when one of the reactants used in the esterification reaction contains unsaturation in its aliphatic chain. These materials and their production are also well known to those skilled in the art. See for example Golding, B., "Polymers and Resins, Their Chemistry and Chemical Engineering," Van Nostrand, New Jersey, 1959, and Kirk, R. E. and Othmer, D. F., eds., "Encyclopedia of Chemical Technology," 1st ed., vol. 10, Interscience Publishers, New York, 1953.

The well-known raw materials used in the polyester esterification reaction include polyfunctional alcohols, particularly the aliphatic glycols such as, for example, ethylene glycol, propylene glycol, diethylene glycol, dipropylene glycol, and the like, and higher functionality polyhydric materials such as glycerol and sorbitol. Other preferred dihydric materials are bisphenol A and hydrogenated bisphenol A. The polyhydric compound is reacted with unsaturated dicarboxylic acids such as for example fumaric and isophthalic and phthalic acid for example. The reaction between a glycol and an acid produces two moles of water which must be removed during the reaction. In the place of the acid the corresponding anhydrides such as maleic and phthalic anhydrides may be used where only one mole of water would be produced. Further, epoxides such as ethylene oxide and propylene oxide, for example, may be reacted either with the acid or corresponding anhydride to form the polyester resin.

In addition, an epoxy such as ethylene oxide or propylene oxide may be reacted with the reaction product of the polyhydric compound and the acid. This would form an alkyoxylated ester such as, for example, the propoxylated fumarate of bisphenol A.

The polyester resin thus formed through any of the known polyesterification processes is in solution with a vinyl monomer which, during curing, cross-links the polymer to form the hard polyester material. The most commonly used vinyl monomer for the cross-linking reaction is styrene; however, other cross-linking monomers such as vinyl toluene, methyl and methacrylate, alphamethyl styrene and diallyl phthalate are also commonly used. The basic resin in the monomer can be polymerized into infusible materials by a free radical reaction by adding a peroxide catalyst such as, for example, cumene hydroperoxide, t-butyl perbenzoate, t-butyl peroctoate and benzoyl peroxide.

Those skilled in the art are quite familiar with other components added to the basic polyester resin to obtain desired properties. These include catalyst activators, pigments, inhibitors, extenders such as calcium carbonate, clays, talcs, hydrated alumina and antimony oxide for example and reinforcement materials such as glass fiber, asbestos and polyvinyl alcohol fibers, for example. The extenders, pigments, catalysts and reinforcements are generally added to the resins by the fabricator using the polyester resin rather than the resin manufacturer itself.

In addition, it is often desirable to produce a fire resistant polyester by adding a fire retardant, usually at the time the catalyst is added. Many fire retardants have been incorporated into polyester materials such as antimony-containing materials, dialkyl posphates and brominated diols, for example. British Pat. 796,466, for example, describes phosphorus containing polyester resins produced by utilizing a dialkyl phosphate and an aliphatic glycol in the system. U.S. Pat. No. 3,009,897, for example, describes the use of an unsaturated phosphine oxide as a fire retardant. Though substantial work with flame retardants in polyester resin compositions has been done, much is left to be desired. For example, halogenated polyesters have rather poor weather stability. I have discovered that the piperazine phosphate salts dissolved herein are particularly useful to fire retard cured polyester resins.

The use of the piperazine phosphate salts described herein in the practice of my invention is accomplished by adding to the polyester resin, usually when catalyst and other additives, if any, are added, an effective amount of said piperazine phosphate salt. This effective amount has been found to be about 15 weight percent and up to about 40 weight percent as a practical upper limit. It should be understood that the upper limit is not critical and is merely a practical consideration as well as a consideration with respect to the properties desired in the final cured polyester product.

The following example illustrates the value of my invention as it pertains to polyester resins. It should be understood however, that this example is presented by way of information and instruction only and should not be considered as limiting since many modifications of the practice of my invention would be obvious therefrom.

EXAMPLE 13

A polyester resin mixture was prepared by adding one part by weight of benzoyl peroxide catalyst, slurried in an equal weight of styrene, to 100 pts. by weight of a 50% solution of propoxylated bisphenol A fumarate in styrene having a Brookfield viscosity of 400–500 cps. at 25° but having no promotors or inhibitors (Atlac 382-05, Atlas Chemical Industries, Inc.). A portion of the mixture was thickened slightly by dispersing in it one part by weight of formed silica (Cab-O-Sil, Cabot).

Piperazine monophosphate monohydrate was made more uniform and free-flowing by the addition of 2 wt. percent by hydrophobic foamed silica (Silonox, Cabot). The mixture ball-milled for 30 minutes.

A dispersion of 100 parts by weight of the phosphate salt mixture in 150 parts by weight of unthickened, catalyzed polyester was made by mixing the ingredients for a few minutes with a mechanical disperser. Aliquots of this mixture were dispersed in thickened polyester to give phosphate levels of 10, 20 and 40 wt. percent.

Castings ¾" x ¾" x 10" were made in a metal mold. The resin was cured at 80° C. for one hour, then 100° C. for three hours. The samples were subjected to both the standard and modified Butler Chimney Test as previously described.

| Type test | Standard Butler | | | | Modified Butler | | |
|---|---|---|---|---|---|---|---|
| Wt. percent phosphate | 40 | 20 | 10 | 0 | 40 | 20 | 0 |
| Sec. to extinguish after flame removal | 0 | 0 | 670 | [1]80 | 1 | 470 | 800 |
| Flame height (inches) | 1 | 1 | 11 | N.A. | 6 | 11 | 11 |
| Wt. percent retained | 100 | 99.9 | 73 | N.A. | 99.5 | 82 | None |

[1] The small burning portion of this sample cracked and popped off, which terminated flame propagation of the sample as a whole.

As previously state, the foregoing discussions of specific systems are merely illustrative of many applications to which the piperazine phosphate salts can be put as a fire retardant for organic polymers and should be construed by those skilled in the art as instructive of modifications which can be made in the practice of the invention making it applicable to organic polymers not specifically discussed or exemplified.

What is claimed is:

1. Fire retardant organic polymers having incorporated therein an effective amount of piperazine pyrophosphate or a piperazine phosphate salt fire retardant of the formula

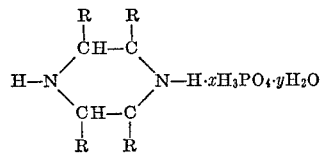

wherein $x$ is 1 or 2, $y$ is 0 or 1 and each R, taken individually, is hydrogen or lower alkyl.

2. The fire retardant organic polymers of claim 1 wherein the piperazine phosphate salt is piperazine monophosphate monohydrate, piperazine, diphosphate, piperazine pyrophosphate or 2-methylpiperazine monophosphate monohydrate.

3. The fire retardant organic polymers of claim 2 wherein the polymer is a polyurethane moisture-cured coating, polyvinyl acetate emulsion coating, an epoxy resin, a polyester resin or a polyurethane foam.

4. The first retardant organic polymers of claim 1 wherein the polymer is a polyurethane moisture-cured coating, polyvinyl acetate emulsion coating, an epoxy resin, a polyester resin or a polyurethane foam.

5. The fire retardant polyurethane foam of claim 4 wherein the piperazine phosphate salt is piperazine monophosphate monohydrate.

6. The fire retardant polyurethane foam of claim 5 wherein said polyurethane foam is produced from a reaction mixture wherein at least one weight percent of the mixture is piperazine phosphate monohydrate.

7. The polyurethane foam of claim 5 wherein the polyurethane is a flexible foam and, further, wherein from one to about 12 weight percent of the foam is piperazine monophosphate monohydrate.

8. The polyurethane foam of claim 5 wherein the polyurethane is a rigid foam and further, wherein from one to about twenty weight percent of the rigid foam is piperazine monophosphate monohydrate.

9. The fire retardant organic polymer of claim 4 wherein the polymer is an epoxy resin.

10. The fire retardant organic polymer of claim 3 wherein the organic polymer is an epoxy resin.

11. The epoxy resin of claim 10 wherein the piperazine phosphate salt is piperazine monophosphate monohydrate.

12. The epoxy resin of claim 10 wherein the piperazine phosphate salt is present in an amount of at least ten weight percent of the weight of said epoxy resin.

13. The epoxy resin of claim 12 wherein the piperazine phosphate salt is piperazine monophosphate monohydrate.

14. The epoxy resin of claim 13 wherein the piperazine monophosphate monohydrate is present in an amount of ten to about fifty weight percent.

15. The fire retardant organic polymer of claim 4 wherein the organic polymer is a moisture-cured polyurethane.

16. The fire retardant moisture-cured polyurethane of claim 15 wherein the piperazine phosphate salt is piperazine monophosphate monohydrate.

17. The fire retardant moisture-cured polyurethane of claim 16 wherein the piperazine monophosphate monohydrate is present in the amount of about ten to about eighty weight percent of the composition.

18. The fire retardant organic polymer of claim 4 wherein the organic polymer is a polyvinyl acetate emulsion coating.

19. The fire retardant polyvinyl acetate emulsion coating of claim 18 wherein the piperazine phosphate salt is piperazine monophosphate monohydrate, piperazine diphosphate or piperazine pyrophosphate.

20. The polyvinyl acetate emulsion coating of claim 19 wherein the piperazine monophosphate monohydrate, piperazine diphosphate or piperazine pyrophosphate comprises about twenty-five to about fifty weight percent of the polyvinyl acetate emulsion.

21. The polyvinyl acetate emulsion coating of claim 20 wherein the piperazine phosphate salt is piperazine monophosphate monohydrate.

22. The fire retardant organic polymer of claim 4 wherein the polymer is a polyester resin.

23. The fire retardant organic polymer of claim 3 wherein the organic polymer is a polyester resin.

24. The polyester resin of claim 23 wherein the piperazine salt is piperazine monophosphate monohydrate.

25. The polyester resin of claim 23 wherein the piperazine phosphate salt is present in an amount of at least about 30 weight percent of the weight of said polyester resin.

26. The polyester resin of claim 25 wherein the piperazine phosphate salt is piperazine monophosphate monohydrate.

References Cited

UNITED STATES PATENTS

| | | | |
|---|---|---|---|
| 3,134,742 | 5/1964 | Wismer | 260—77.5 SS |
| 3,423,343 | 1/1969 | Barnett | 260—2.5 AJ |

OTHER REFERENCES

Lyons: The Chemistry and Uses of Fire Retardants, Wiley—Interscience, New York, 1970, pp. 33–36, 169–172, 260–272, 290, 353–4, 372, 402–4.

DONALD E. CZAJA, Primary Examiner

C. WARREN IVY, Assistant Examiner

U.S. Cl. X.R.

260—29.6 MP, 29.6 MN, 45.8 N, 77.5 SS